H. P. REED & W. C. KENNEDY.
MOTOR CONTROLLER.
APPLICATION FILED MAR. 1, 1915.

1,262,257.

Patented Apr. 9, 1918.

Witnesses
J. L. Johnson
L. A. Watson

Inventors
Harrison P. Reed
Walter C. Kennedy
By Frank H. Hubbard
Attorney

UNITED STATES PATENT OFFICE.

HARRISON P. REED AND WALTER C. KENNEDY, OF MILWAUKEE, WISCONSIN, ASSIGNORS TO THE CUTLER-HAMMER MFG. CO., OF MILWAUKEE, WISCONSIN, A CORPORATION OF WISCONSIN.

MOTOR-CONTROLLER.

1,262,257. Specification of Letters Patent. Patented Apr. 9, 1918.

Application filed March 1, 1915. Serial No. 11,193.

*To all whom it may concern:*

Be it known that we, HARRISON P. REED and WALTER C. KENNEDY, citizens of the United States, residing at Milwaukee, in the county of Milwaukee and State of Wisconsin, have invented new and useful Improvements in Motor-Controllers, of which the following is a full, clear, concise, and exact description, reference being had to the accompanying drawing, forming a part of this specification.

This invention relates to improvements in motor controllers and more particularly to field controlling means for motors having shunt field windings.

In elevator and other service where the maximum speed of a controlled motor is obtained by field regulation and where the speed increase by field regulation is relatively great with respect to the normal speed of the motor, it has been proposed to weaken the motor field by progressive inclusion of a plurality of steps of field resistance to avoid jarring the driven mechanism. Likewise, in decelerating the motor it has been proposed to remove the field resistance in steps for a similar purpose. However, considerable difficulty has been experienced in timing the inclusion and exclusion of the steps of resistance to accomplish the result mentioned.

One of the objects of this invention is to provide control means which will overcome the aforesaid difficulty.

A further object is to provide means for the aforesaid purposes which will be free from interference by varying load conditions and the like.

Other objects and advantages of the invention will hereinafter appear.

The accompanying drawing illustrates a controller embodying the invention in one form and the same will now be described, it being understood that the invention is susceptible of embodiment in other forms embraced within the scope of the appended claims.

Figure 1:
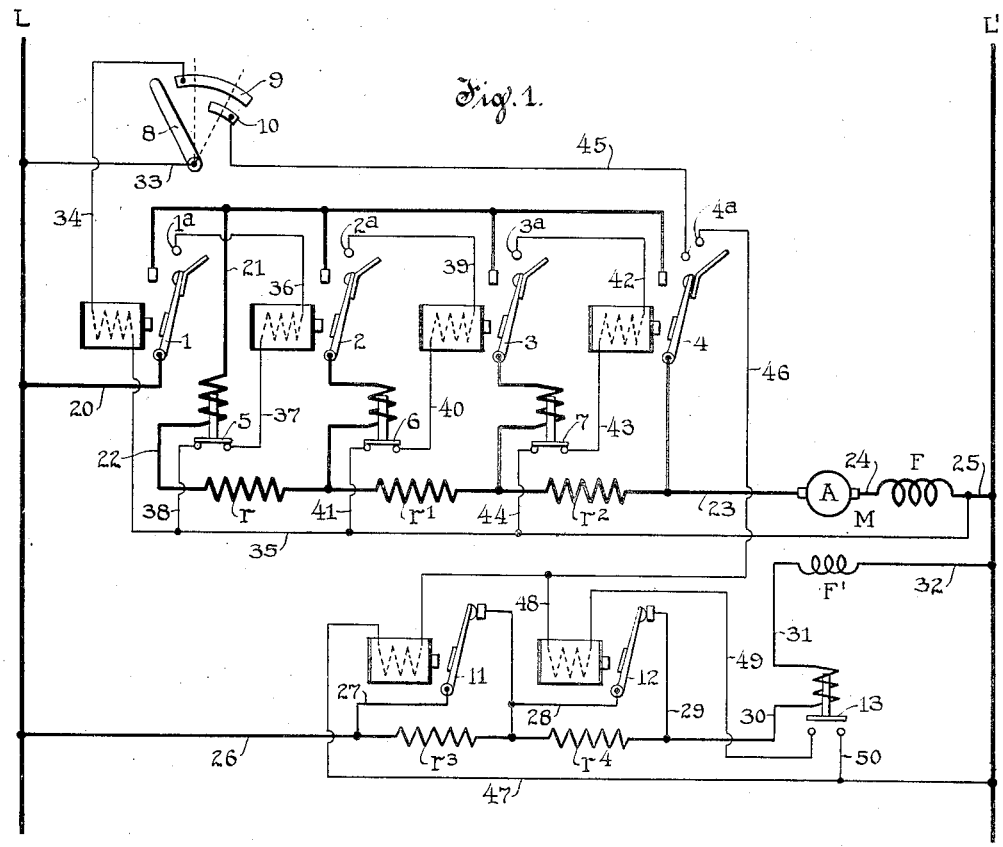
Figure 1 is a schematic view of the controller.

The controller illustrated is particularly applicable to elevator service and is shown as controlling a compound motor M having an armature A, a series of field winding F, and a shunt field winding F'. The controller includes automatic starting means of a conventional type to bring the motor up to normal speed, and field regulating means, as hereinafter specified, for increasing the speed of the motor above normal and restoring the same to normal as may be desired.

The starting means includes an electro-responsive main switch 1, a plurality of electro-responsive accelerating switches 2, 3 and 4 and series relay switches 5, 6 and 7 governing the operation of said accelerating switches. The switches 2, 3 and 4 effect acceleration of the motor through the control of armature resistances $r$, $r'$ and $r^2$ controlled thereby respectively. The accelerating switches are interconnected with one another and with the main switch to respond progressively upon response of said main switch but subject to arrest by response of the relay switches 5, 6 and 7 under abnormal current conditions, as is well understood. The main switch 1 in turn is governed by a suitable control switch 8 and more particularly through the medium of the contact segment 9 of said switch. The aforesaid interconnections of the switches are controlled by auxiliary contacts $1^a$, $2^a$ and $3^a$ of switches 1, 2 and 3 respectively.

The field regulating means includes two sections $r^3$ and $r^4$ of field resistance respectively controlled by electro-responsive switches 11 and 12. Also, this means includes a relay switch 13 governing the switch 12. The switches 11 and 12 are both of the normally closed type to normally short-circuit the field resistances and are responsive to their respective windings to open the short-circuits around said resistances. The circuits of both of the switches 11 and 12 are controlled by the switch 8, and more particularly by the contact 10 thereof, and extend through auxiliary contacts $4^a$ of the accelerating switch 4. The response of the switches 11 and 12 is thereby rendered subject to the setting of the control switch 8 and also subject to response of the last accelerating switch which insures against field weakening until the motor is brought up to normal speed. It might, however, be advisable in certain conditions to subject switches 11 and 12 to accelerating switch 3, instead of switch 4, in order to obtain some field weakening prior to the exclusion of all the armature resistance, but in both cases response of the switch 12 is dependent upon closure of the relay switch 13 which has its winding connected in series in the field circuit and which is so calibrated as to respond to the normal field current to open circuit through its contacts. Thus under normal conditions, and irrespective of load conditions and the like, the relay switch 13 will insure against response of switch 12 until after response of the switch 11 to insert the resistance $r^3$ in the field circuit to reduce the field strength. Moreover, the current reduction by the resistance $r^3$ takes an appreciable time which delays the release of the relay switch and in consequence insures the elapse of an appreciable period between the response of the switch 11 and the response of the switch 12. The action of the relay may, of course, be varied by adjustment thereof, and thus the timing of the response of switch 12 may be regulated as desired. However, it will be understood by those skilled in the art that a very brief interval will, if well defined, serve the aforesaid purpose. This provides for the desired conditions of acceleration and those of deceleration are provided for by the construction of the switch 12.

Figure 2:
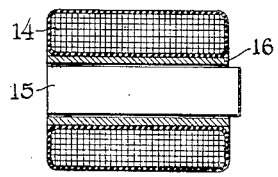
Fig. 2 is a view showing certain details of construction of one of the switches diagrammatically illustrated in Fig. 1.

As illustrated in Fig. 2 the magnet 14 of switch 12 has its core 15 surrounded by a copper tube 16. This provides for a local magnetic flux of the magnet which delays the release of the switch 12 when the magnet 14 is disconnected from circuit. This in turn results in causing the switch 12 to lag behind the switch 11 in short-circuiting the field resistance and thereby provides the time element desired. Moreover, it will be understood that the time element thus secured may be varied within certain limits by varying the thickness of the copper tube 16.

The circuits, while obvious, will now be briefly traced. With the main switch 1 closed the motor circuit extends from line L, by conductor 20 through said switch, by conductor 21 through the winding of relay 5, by conductor 22 through the resistances $r$, $r'$ and $r^2$ in series, by conductor 23 through the motor armature A, by conductor 24 through the series field winding F, by conductor 25 to line L'. The shunt field, on the other hand, is permanently connected across the line, its circuit extending from line L by conductors 26 and 27 through the switch 11, by conductor 28 through switch 12, by conductors 29 and 30 through the winding of relay 13, by conductor 31 to and through said field winding, and by conductor 32 to line L'. When accelerating switch 2 responds it short-circuits the resistance $r$ and the winding of relay 5, at the same time including in circuit the winding of relay 6. Accelerating switch 3 in responding similarly short-circuits the resistance $r'$ and the winding of relay 6, at the same time including in circuit the winding of relay 7. Accelerating switch 4 in closing short-circuits the resistance $r^2$ and the winding of relay 7. These comprise all the power circuits for the motor armature and series field winding and the action of the field switches 11 and 12 has already been described.

Considering now the control circuits, switch 8 when in engagement with contact 9 completes circuit from line L by conductor 33 through said contact 9, by conductor 34 through the winding of main switch 1, by conductors 35 and 25 to line L'. Switch 1 upon responding completes circuit from line L by conductor 20 through its auxiliary contact 1ª, by conductor 36 through the winding of accelerating switch 2, by conductor 37 through the relay switch 5, by conductor 38 to conductor 35 and thence to line L'. Accelerating switch 2 in closing completes circuit from switch 1 through its auxiliary contacts 2ª, by conductor 39 through the winding of accelerating switch 3, by conductor 40 through the relay switch 6, by conductor 41 to conductor 35 and thence to line L'. Accelerating switch 3 upon responding also completes circuit from switch 1 through its auxiliary contacts 3ª, by conductor 42 through the winding of accelerating switch 4, by conductor 43 through the relay switch 7, by conductor 44 to conductor 35 and thence to line L'. This, as above set forth, provides for energization of the main switch and subsequent automatic energization of the switches 2, 3 and 4 in progression. This completes the operation of the controller until the switch 8 is moved to engage contact 10, whereupon circuit is closed from line L, by conductor 33 to said contact 10, by conductor 45 through the auxiliary contacts 4ª of accelerating switch 4, by conductor 46 through the winding of switch 11, by conductor 47 to line L'. This provides for the above-described response of switch 11 to insert the field resistance $r^3$ and, upon closure of the relay 13, circuit is also closed from conductor 46 by conductor 48 through the winding of switch 12, by conductor 49 through said relay switch 13, by conductors 50 and 47 to line L' which effects response of said switch 12 and inclusion of field resistance $r^4$.

It will thus be observed that the control means illustrated is exceedingly simple but at the same time entirely dependable and efficient. Also, it will be observed that the control means illustrated is susceptible of modification as, for example, in the number of field control switches and controlling relays therefor.

What we claim as new and desire to secure by Letters Patent is:

1. In a controller for a motor having a shunt field, the combination with field weakening means operable in steps, of means insuring delay of a step of operation of said former means pending a definite field weakening effect of a preceding step of operation of said field weakening means.

2. In a controller for a motor having a shunt field, the combination with means operable to weaken the shunt field gradually, of means responsive to the field current to regulate the rate of operation of said former means according to the rate of field weakening accomplished thereby.

3. In a controller for a motor having a shunt field, the combination with a field resistance and means for including the same in circuit in steps, of electro-responsive governing means for said former means responsive to the field current to necessitate a predetermined reduction in the field current by one step of said resistance prior to the inclusion of a succeeding step of said resistance.

4. In a controller for a motor having a shunt field, the combination with a plurality of electro-responsive field weakening devices, of means governing one of said devices to insure against response thereof pending a definite field weakening effect of another of said devices.

5. In a controller for a motor having a shunt field, the combination with a plurality of field resistances and electro-magnetically operated switches to include the same in circuit, of an electro-responsive throttling device for one of said switches responsive to the field current to delay the inclusion of the resistance controlled by its respective switch until after weakening of the shunt field to a definite degree following the inclusion of another of said resistances.

6. In a motor controller, the combination with a plurality of sequentially operable electro-responsive current regulating devices and a master switch therefor, of a plurality of electro-responsive current regulating switches having operating windings in a circuit controlled jointly by one of said devices and said master switch and means governed by the current regulated by one of said switches for controlling the response of another, said last-mentioned switch inherently lagging behind said one of said switches in reverse operation.

7. In a motor controller, in combination, a plurality of electro-responsive switches, means tending to effect simultaneous operation of said switches in both directions, and electro-responsive means for effecting successive operation of said switches in one direction, one of said switches inherently lagging behind the other in reverse operation.

8. In a controller for a motor having a shunt field winding, in combination, field regulating means including a plurality of electro-responsive switches responsive for field weakening, control means for said switches providing for simultaneously interrupting their energizing circuits for field strengthening and means associated with one of said switches for insuring a time interval between the field strengthening operations of said switches.

In witness whereof we have hereunto subscribed our names, each in the presence of two witnesses.

HARRISON P. REED.
WALTER C. KENNEDY.

Witnesses:
 TEKLA BAST,
 L. A. WATSON.